(12) United States Patent
Sandell

(10) Patent No.: US 6,312,778 B1
(45) Date of Patent: Nov. 6, 2001

(54) WEB-SHAPED LAMINATED PACKAGING MATERIAL, A METHOD OF PRODUCING THE SAME, AND PACKAGING CONTAINERS PRODUCED FROM THE LAMINATED PACKAGING MATERIAL

(75) Inventor: Karl-Håkan Sandell, Lund (SE)

(73) Assignee: Tetra Laval Holdings & Finance S.A., Fully (CH)

( * ) Notice: Subject to any disclaimer, the term of this patent is extended or adjusted under 35 U.S.C. 154(b) by 0 days.

(21) Appl. No.: 09/171,134
(22) PCT Filed: Apr. 16, 1997
(86) PCT No.: PCT/SE97/00642
  § 371 Date: Oct. 13, 1998
  § 102(e) Date: Oct. 13, 1998
(87) PCT Pub. No.: WO97/39885
  PCT Pub. Date: Oct. 30, 1997

(30) Foreign Application Priority Data

Apr. 19, 1996 (SE) .................................................. 9601500

(51) Int. Cl.$^7$ ................................ B31F 5/04; B32B 3/08; B32B 15/12
(52) U.S. Cl. ......................... 428/57; 156/157; 156/159; 156/250; 156/502; 428/58; 428/60; 428/464
(58) Field of Search ........................... 428/36.9, 36.91, 428/458, 461, 480, 483, 33, 35.3, 35.8, 36.1, 56, 57, 58, 59, 77, 200; 156/159, 254, 264, 266, 308.2, 502, 505, 512

(56) References Cited

U.S. PATENT DOCUMENTS

| | | | |
|---|---|---|---|
| 3,449,186 | * 6/1969 | Rano | 156/159 |
| 3,770,540 | * 11/1973 | Fuchs et al. | 156/157 |
| 4,067,763 | * 1/1978 | Mandersson | 156/264 |
| 4,080,235 | 3/1978 | Mandersson | 156/157 |
| 4,256,791 | * 3/1981 | Holmstrom et al. | 428/77 |
| 4,461,667 | 7/1984 | Pupp | 156/244.11 |
| 5,767,491 | 6/1998 | Ohlsson et al. | 219/633 |

FOREIGN PATENT DOCUMENTS

| | | | |
|---|---|---|---|
| 1 816 108 | 7/1969 | (DE) . | |
| 29 46 739 | 5/1980 | (DE) . | |
| 578444 | * 6/1946 | (GB) | 156/159 |
| 1013656 | 12/1965 | (GB) . | |
| 423 693 | 5/1982 | (SE) . | |

* cited by examiner

Primary Examiner—Harold Pyon
Assistant Examiner—Sandra M. Nolan
(74) Attorney, Agent, or Firm—Burns, Doane, Swecker & Mathis, L.L.P.

(57) ABSTRACT

The disclosure relates to a laminated, web-shaped packaging material intended for packaging containers in which the longitudinal joint has improved gas-and liquid-tightness properties and is substantially planar. The laminated, web-shaped packaging material includes a core layer and a layer of metal or metal oxide applied on one side of the core layer, and is processed along the longitudinal edges of the web in such a manner that the metal layer is exposed from the core layer along one of the edges and the edges are then covered with outer layers of plastic.

9 Claims, 2 Drawing Sheets

Figure 1:
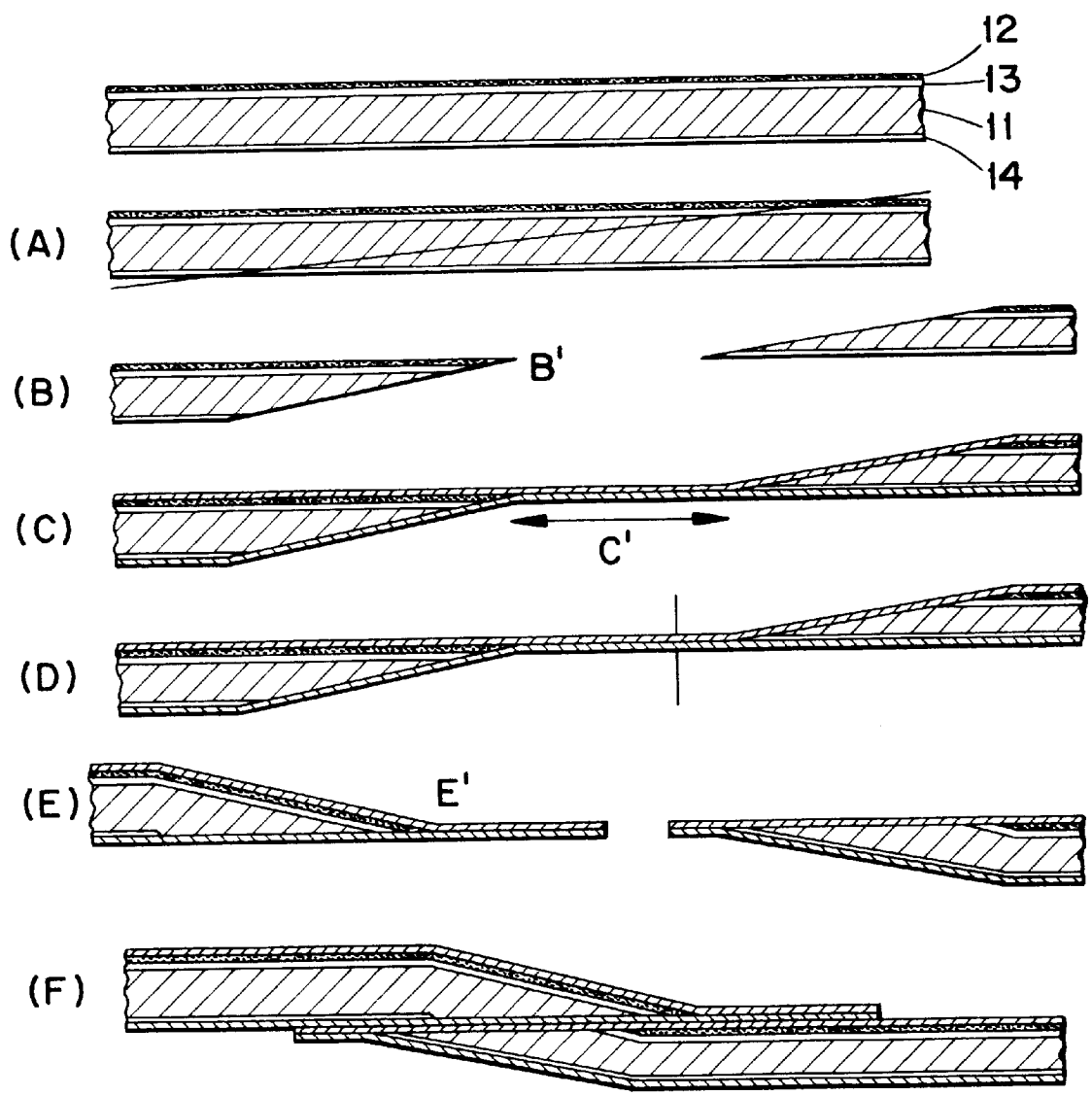

WEB-SHAPED LAMINATED PACKAGING MATERIAL, A METHOD OF PRODUCING THE SAME, AND PACKAGING CONTAINERS PRODUCED FROM THE LAMINATED PACKAGING MATERIAL

TECHNICAL FIELD

The present invention relates to a laminated, web-shaped packaging material comprising a core layer and a layer of metal or metal oxide applied on one side of the core layer. The present invention further relates to a method of producing the laminated, web-shaped packaging material, as well as to packaging containers produced from the material.

BACKGROUND ART

In the packaging industry, use has long been made of packages of a single-use nature (so-called single-use disposable packages) for packing and transporting products such as, for example, liquid foods. A very large group of these single-use packages is produced from a laminated packaging material comprising a core layer of paper or paperboard and outer, liquid-tight coatings of plastic, preferably polyethylene, on both sides of the core layer.

The composition of a packaging material is intended to impart to the package the best possible product protection properties for the packed product, at the same time as making the package both easy to produce and easy to handle. A core layer gives the package good mechanical configurational stability so that the package may be distributed in a simple, rational manner, and be conveniently handled, at the same time as outer, liquid-tight coatings of plastic afford effective protection against the penetration of moisture and wet into the packaging material. Preferably, the outer, liquid-tight plastic coatings consist of a thermoplastic, for example polyethylene, which moreover imparts to the laminated packaging material excellent thermosealing properties such that the packages may permanently be given their desired geometric configuration by conventional thermosealing during the conversion of the laminated packaging material into finished packaging containers.

Such packaging containers are often produced in that a web of packaging material is reformed into a tube by the longitudinal edges of the web being united to one another, whereafter the tube is filled with the intended contents and is sealed along narrow, transverse, spaced-apart sealing zones. The sealed-off portions of the tube thus containing their intended contents are then separated from the tube by means of incisions in the above-mentioned-sealing zones and are formed by folding into optional geometric configurations depending on the orientation of the sealing joints or seams.

A laminated packaging material comprising a core layer and outer plastic coatings as described above thus makes for a rational production of configurationally stable, liquid-tight packages possessing superior tightness properties against moisture and wet, but almost entirely lacks tightness properties vis-a-vis gases, in particular oxygen gas.

In order to supplement the prior art laminated packaging material with such gas tightness properties, it is known in the art to apply a layer of metal or metal oxide, for example aluminum (Alifoil) on one side of the core layer between the core layer and the one outer plastic coating of the packaging material.

A feature common to the above-described packaging containers is that an incision edge of the packaging material will be exposed to the contents of the finished package if the tube joint or seam is of the overlap type, which in turn implies that the contents may readily be sucked into the packaging material if this includes an absorbent material such as, for example, paper or paperboard. If the contents are sterilized and packed under aseptic conditions, the unprotected incision edge must not come into contact with the contents, but must be protected in some way or other.

In many cases, the packaging material web undergoes a sterilization stage before being formed into a tube, for example by dipping in a bath of hydrogen peroxide solution. If the core layer includes a fibrous, absorbent material, the further drawback arises that the packaging material sucks up sterilization liquid which may cause difficulties in the longitudinal joint seal in the form of, for example the occurrence of vapor blisters. It is therefore desirable also from this viewpoint to protect the incision edge against the penetration of liquid and moisture.

The most important reason why the incision edge must be screened off from the packed product when the packaging material includes a metal layer is that metals, in compliance with laws and regulations on packaging of foods, may not be in direct contact with the food products because of the negative effects that metals have we on such products.

One known method of avoiding direct contact between the incision edge and the contents of the package is to cover the incision edge with a longitudinal plastic strip which, at the same time as the tube is formed, is advanced and sealed in place against the inner plastic coating of the packaging material tube over the incision edge. This method is circumstantial to put into effect, since the loose strip must be positioned in connection with the longitudinal joint sealing operation.

A further method of solving the problem of'sealing/tightening the incision edge of the packaging material is, on production of the packaging material, to give the inner plastic layer such width that it projects out with an edge zone over the one edge of the core or carrier layer, in which event the projecting edge zone is, on production of the packaging material tube, sealed against the inner plastic coating of the opposing, overlapping edge zone, in such a manner that the incision edge is automatically sealed off.

Swedish Patent SE 78121423 describes how the incision edge of the longitudinal joint on the inside of a tube of a packaging material including a layer of aluminium is covered by a projecting aluminium foil strip and a plastic strip which projects further out from the core layer and which is sealed to the inner plastic coating of the opposing edge zone. Since the aluminium foil strip also covers the incision edge, vapor or steam blisters are prevented from occurring on sealing of the longitudinal joint when the water which is always bonded in the fibrous core or carrier layer is vaporized.

However, it has proved to involve certain difficulties to seal such a thin, projecting plastic strip to the inner plastic layer of the opposing edge, on the one hand because it is difficult to keep the projecting strip in place during the sealing operation and, on the other hand, because it is difficult to control the sealing tool such that the sealing pressure is applied equally and simultaneously over both the free plastic strip and over the overlap region proper in the longitudinal joint zone.

United Kingdom Patent GB 1013656 describes a method of folding over such a projecting plastic strip as described above around the edge of the overlapping laminate and sealing it to the plastic-coated inside of the subjacent, opposing edge zone. In such a fold-over operation, it is also difficult to position the projecting edge strip so that the longitudinal joint is protected and tight throughout the entire length of the packaging material tube in an operationally reliable manner.

A feature common to the various methods of production including a plastic strip projecting from the web edge is that the lamination process becomes circumstantial and complicated when the packaging material is produced. Either the layer in which the projecting strip is included must be applied such that it extends outside the edges of the rest of the laminate web, or it must be first applied and then, in a second stage, be delaminated and released from the rest of the laminate web in the edge zone regions.

The above-described prior art technology is based on the assumption that the one edge of the packaging material overlaps the opposing edge so that the longitudinal joint of the material tube is strong and durable. However, the drawback then arises that the wall of the packaging container will be twice as thick in the longitudinal joint area than in the rest of the package.

OBJECTS OF THE INVENTION

One object of the present invention is therefore to realize a novel laminated packaging material of the type described by way of introduction without consequential problems of the nature intimately related to the prior art methods.

A further object of the present invention is to realize a packaging material for gas and liquid-tight packaging containers possessing improved gas- and liquid-tightness properties in the longitudinal joint of the packaging container.

Still a further object of the present invention is to realize a packaging material for packaging containers with a substantially planar longitudinal joint.

SOLUTION

According to the present invention, the core layer in the laminated packaging material may consist of a conventional fibre layer of paper or paperboard of suitable packaging qualities. Core layers of other materials such as plastic may also be employed. Examples of such plastics may be polyethylene, polypropylene, polyester, polyamide etc., including plastics with both solid and foamed or expanded structure.

The metal layer applied as a gas barrier on one side of the core layer may include a metal or a metal oxide or another inorganic chemical compound. Preferred examples of such gas barrier layers consist of aluminium, aluminium oxide or a silica oxide SiOx, where x may vary between 1.5 and 2.2. Such a gas barrier layer may be applied in a thin layer direct on the core layer with the aid of some form of deposition technique, for example vacuum deposition, or in the form of a foil which is laminated to the core layer with the aid of a so-called adhesive binder layer or a lamination layer. Such lamination layers are known to persons skilled in the art.

The metal layer may be exposed from the core layer along one edge in different ways, for example by cutting a groove in the metal layer and then delaminating it from the core layer, or by oblique tearing or oblique cutting. The edge is thus processed in such a manner as makes for an overlap in the longitudinal joint seam whose thickness is less than twice the thickness of the packaging material, for example by giving the edge L-shaped or staircase configuration or alternatively a bevelled, obliquely cut appearance. Preferably, the metal layer is exposed in that the edges are cut obliquely so that the outermost tip of one edge of the material web consists of exposed metal or metal oxide.

Since this outermost tip of exposed metal or metal oxide (i.e. gas barrier material) on the inside of the packaging container will overlap the gas barrier material in the opposing edge zone with but a thin layer of thermosealable plastic in between, an improved gas barrier effect will be achieved in the longitudinal joint region. In conventional packaging containers, the two metal layers overlap one another in such a manner that also the core layer of the one edge and other intermediate layers (if any) come between the metal layers. For example oxygen gas will penetrate via these intermediate layers which lack gas barrier properties, unless the inside of the longitudinal joint is sealed by other means, for example with a strip of a material possessing superior gas barrier properties.

In the packaging material according to the present invention the processed edges are wholly covered by a layer of a thermosealable plastic, preferably an extrudable thermoplastic. Examples of applicable thermosealable plastics which may be employed in the outer covering plastic layers in the packaging material according to the present invention are LDPE (Low Density Polyethylene), HDPE (High Density Polyethylene), PP (Polypropylene) and PET (Polyethylene Terephthalate). Preferably, a polyethylene plastic is used.

The thickness of the different lamination layers of the packaging material is not critical. The various layers of the packaging material may have any thickness which is applied according to prior art techniques in known packaging materials.

Given that the metal or metal oxide layer functioning as gas barrier is exposed at one of the edges of the packaging material web and covered with outer layers of plastic, an overlap will be obtained in the longitudinal joint of the packaging container which is both gas- and liquid-tight, direct contact between metal and contents also being prevented. In addition, an overlap will be obtained which is thinner than twice the thickness of the packaging material. The transition of the longitudinal joint to the surrounding packaging material is preferably almost planar, which makes for an improved decor appearance at the longitudinal joint on the outside of the packaging container.

According to another aspect of the present invention, there will be realize a simple and efficient method of producing a packaging material for a packaging container possessing improved gas- and liquid-tightness properties in the longitudinal joint and an improved decor appearance on its outside.

SUMMARY OF THE INVENTION

Processing of the longitudinal edges of the web-shaped packaging material may thus be put into effect by cutting a groove in the metal layer and then delaminating this layer from the core layer, or by oblique tearing or oblique cutting. The edge is processed in such a manner as makes possible an overlap in the longitudinal joint whose thickness is less than twice the thickness of the packaging material, for example by giving the edge an L-shaped or staircase shaped appearance, or alternatively a bevelled, obliquely cut appearance. Preferably, the metal layer is exposed in that the edges are obliquely cut such that the outermost tip of one edge of the material web consists of an exposed metal or metal oxide. On oblique tearing, it may prove to be necessary to insert an extra operational step for cleaning the metal layer from adhering fibres in the one edge so that the metal layer is exposed.

According to one preferred embodiment of the present invention, the edges of the material web are obliquely cut such that the outermost tip of one longitudinal edge consists of exposed metal. The oblique cutting entails as an additional advantage that the web width that is needed for producing a packaging container by tube formation is less than the web width that is needed for producing a packaging container of the same size in overlapping of the joint according to prior art methods. As a rough estimate, material consumption may be reduced by approx 1–1.5 percent.

In oblique cutting, the cut is made at an angle in relation to the horizontal plane of the material web which is sufficiently small to achieve good adhesion of the outer covering plastic layers along the sloping edges, but at the same time sufficiently large for the edges to be durable in machine and storage handling.

The longitudinal edges of the web may be covered with plastic either by encapsulating the edges in a separate application stage, but preferably the covering layer on the edges of the material web consists of a continuous united part of the plastic layer that covers both sides of the entire packaging material web. By for example, covering both sides of the material web with outer plastic layers and at the same time allowing the plastic layers to extend outside the edges of the web and there be sealed to one another, the edges may also be covered in this manner.

The sides and edges of the material web may be covered simultaneously by laminating the material web with a prefabricated plastic film on each side or by applying a plastic film by extrusion to each side of the material web. Preferably, a covering plastic layer is applied over both sides and edges of the material web by extrusion.

Edge processing may be effected of one material web intended for a packaging container tube at a time or several part webs running beside one another simultaneously. Edge processing of a plurality of part webs simultaneously may be effected in that a fist, wide material web is split lengthways by means of an edge processing splitting operation into two or more narrower part webs which are each intended for a packaging container tube.

The thus split and edge-processed part webs are then spaced to a predetermined mutual spacing from one another, and are coated with a covering outer layer of plastic on each side of all of the part webs, the outer layer extending over the total width of the part webs, and being fixed to the above-mentioned spaced part webs, for the formation of a wider continuous web, whereafter the part webs are once again split lengthways by means of an incision through the strip of thermoplastic layer which is formed in the spaces between the longitudinal edges of the part webs.

The outer layers of plastic may be applied simultaneously or in two sequential stages with subsequent splitting of the double plastic layer formed between the part webs. They may also be applied separately in two stages with an intermediate stage which includes splitting of the first single plastic layer which is formed between the part webs on covering of one side of the part webs, and subsequent additional spacing of the part webs (which are plastic-coated on one side) to a predetermined mutual spacing from one another.

A further advantage that is inherent in the fact that the packaging material webs ready to use for tube formation are entirely covered with plastic on both sides and along the edges after edge processing is that the ready packaging material is completely dust-free. Any possible loose fibres and dust that may have been created in connection with processing of the edges of the webs will be located under the plastic layer and, as a result, cannot cause any problems during the conversion into and filling of the packaging containers.

BRIEF DESCRIPTION OF THE ACCOMPANYING DRAWINGS

Figure 2:
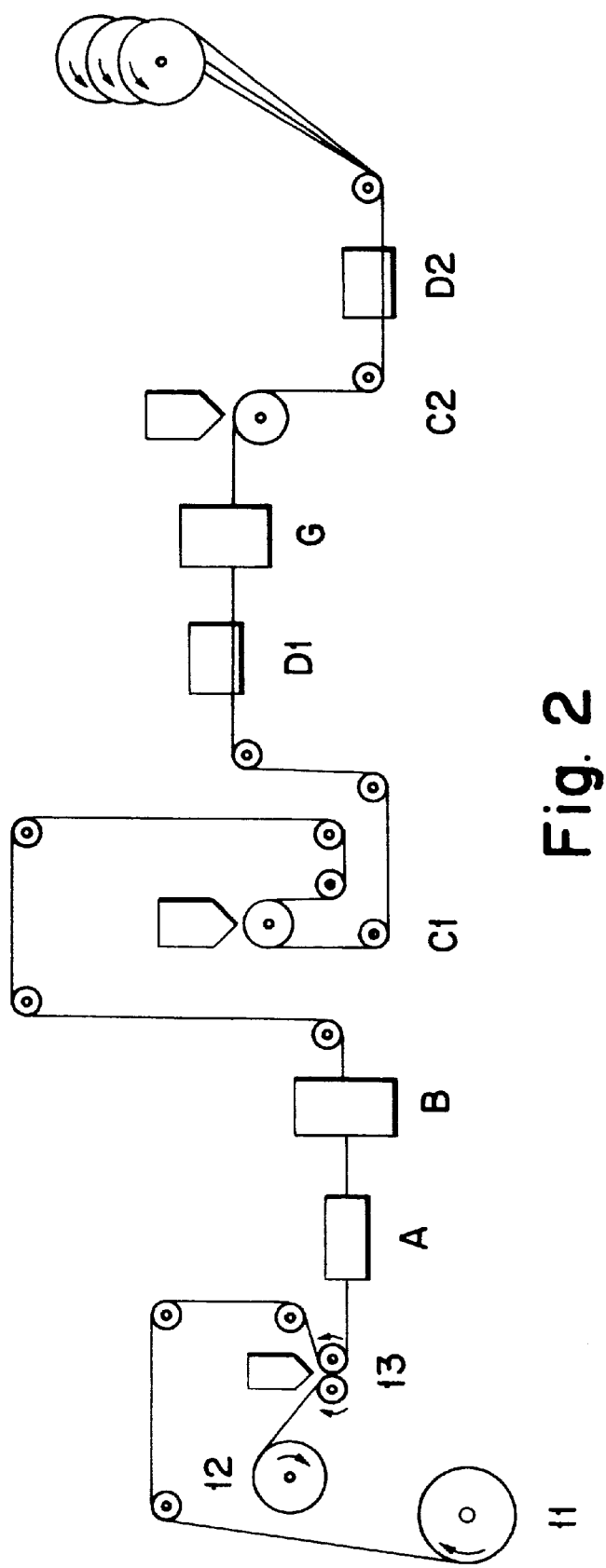

One embodiment of the packaging material according to the present invention and a method for its production will now be described in greater detail hereinbelow, with particular reference to the accompanying Drawings, in which FIG. 1 schematically illustrates a cross section of the longitudinal edges of the web-shaped packaging material in different stages up to joining of the longitudinal joint of the packaging container according to the invention; and FIG. 2 schematically illustrates a method of producing the packaging material according to the invention, as shown in FIG. 1.

It should be observed that while the present invention is described in greater detail below with particular reference to specific embodiments shown on the Drawings, it will be obvious to a person skilled in the art that different modifications and variations may be made without departing from the inventive concept as this is defined in the appended Claims.

DESCRIPTION OF PREFERRED EMBODIMENT

FIG. 1 thus schematically illustrates one example of a cross section of the longitudinal edges of the web-shaped packaging material in different stages up to the joining together of the longitudinal joint of the packaging container in one preferred embodiment according to the invention.

The web-shaped packaging material consists of a core layer 11 of paper or paperboard and a layer of metal 12, for example aluminium, applied thereon. The metal layer may be laminated to the core layer by means of a lamination layer 13. The core layer has been provided on its one side with printed decor 14 which is to be sen on the outside of the package.

By cutting the laminated material web obliquely in the longitudinal direction of the web on splitting of a first, wide web into a plurality of narrower part webs (A), there will be obtained an incision such that the metal layer will be exposed in the outermost tip of the one longitudinal edge (B'). The newly formed part webs are spaced to a predetermined spaced apart relationship from one another (B) and are then coated with outer layers of plastic on both sides (C) extending over the entire width of all part webs, a strip of one plastic layer (C') being formed between the part webs. The part webs are once again separated from one another (D) by means of an incision through the above-mentioned plastic layer between the part webs. On the reforming of each part web into a tube, the obliquely cut edges of the part web are thus laid against one another (E) so that the exposed, plastic-encapsulated metal edge (E') overlaps the metal layer of the opposing edge, whereafter the edges in this position (F) are thermosealed to one another. According to the present invention, the illustrated packaging material (E) in FIG. 1 may be produced in the manner which is schematically illustrated in FIG. 2 in which, for purposes of clarity, the same reference numerals have been employed as in FIG. 1 for identical or corresponding parts.

A core layer web 11 of paper or paperboard and a web of aluminium foil 12 are laminated to one another by means of extrusion of a lamination layer 13. The thus formed web-shaped packaging material is thereafter split lengthways (A) into a plurality of narrower part webs. The part webs which now run precisely adjacent one another are subsequently spaced to a predetermined spaced apart relationship from one another (B). This spacing operation may, for example, be carried out with the aid of so-called spreader rollers whose symmetry axes have been offset somewhat at an angle in relation to one another in such a manner that the part webs are spread apart relative to one another so that an adjustable spacing will occur between the part webs.

The part webs are thereafter coated by extrusion of a plastic layer (C1) which extends over the entire width of all part webs, so that a single plastic layer is formed between the part webs (C1'). The part webs are once again separated from one another by an incision through the plastic layer between the part webs (D1) and are once again spaced from one another (G). The part webs thus coated with plastic on their one side are thereafter coated by extrusion of a second plastic layer (C2) which extends over the entire width of all part webs on the other side of the part webs so that a single plastic layer is formed between the part webs (C2'). Finally, the part webs are separated from one another once again by an incision through the plastic layer between the part webs (D2).

Gas- and liquid-tight packaging containers are thereafter produced by tube and fold formation of one such part web in which the metal layer along one of the longitudinal edges of the material web is exposed from the core layer and covered with an outer layer of plastic, in that the longitudinal edges of the material web are sealed to one another in a joint in the longitudinal direction of the tube, so that the edge in which the layer of metal or metal oxide is exposed from the core overlaps the metal layer in the opposing edge of the material web. Preferably, the longitudinal edges of the material web are obliquely cut and overlap one another in the joints in the longitudinal direction of the tube, so that the transition between overlapping edge and subjacent packaging material will be as good as planar on both the inside and outside of the packaging container.

It will thus be apparent from the foregoing description that the present invention, in a simple manner and with simple means, attains the objects of the invention and realizes an effectively laminated packaging material for packaging containers with improved gas and liquid barrier properties in the longitudinal joint, at the same time as the packed product is protected from direct contact with the metal layer, and the longitudinal joint of the packaging container can be made as good as planar without an unsightly joint edge on the outside of the packaging container.

What is claimed is:

1. A web of laminated packaging material, comprising a core layer and a layer of metal or metal oxide applied on one side of the core layer, wherein said metal or metal oxide layer is exposed from the core layer along one of the edges of the packaging material upon being split lengthwise into at least two part webs; wherein outer layers of plastic are arranged on both sides of the at least two part webs so that they cover longitudinal edges of the core layer and the metal or metal oxide layer.

2. The web of laminated packaging material as claimed in claim 1, wherein its longitudinal edges are obliquely cut in the longitudinal direction of the web so that the metal or metal oxide layer is exposed from the core layer along one edge; and that the edges are covered with outer layers of plastic.

3. The web of laminated packaging material as claimed in claim 1, wherein the metal or metal oxide layer consists of aluminium.

4. The web of laminated packaging material as claimed in claim 1, wherein the core layer consists of paper or paperboard.

5. A method of producing a web of laminated packaging material, comprising the steps of:

applying a metal or metal oxide to a core layer;

processing the web such that said metal or metal oxide layer is exposed from the core layer along one edge; and covering the web, including both longitudinal edges of the core layer and the exposed layer, with outer layers of plastic on both sides;

wherein the web comprising the core layer and the metal or metal oxide layer is split lengthwise into at least two part webs, whereafter the part webs are covered with outer layers of plastic on both sides.

6. The method of producing a web of laminated packaging material as claimed in claim 5, wherein the longitudinal edges of the web are processed by oblique cutting.

7. The method of producing a web of laminated packaging material as claimed in claim 6, wherein said part webs are, after splitting, spaced to a predetermined mutual spaced apart relationship; and that the thus spaced part webs are coated on both sides with an outer layer of plastic which covers all part webs and which extends over the entire width of the part web and is fixed to said spaced part webs, for the formation of wider continuous web; whereafter the art webs are split lengthwise by an incision through the thermoplastic layer between the longitudinal edges of the part webs.

8. A gas- and liquid-tight packaging container produced by tube and fold formation of a material web comprising a core layer and a layer of metal or metal oxide applied on one side of the core layer, and also outer layers of plastic, wherein the metal or metal oxide layer is, along one of the longitudinal edges of the material web, exposed from the core layer upon being split lengthwise into part webs, wherein outer layers of plastic are arranged on both sides of the at least two part webs so that they cover longitudinal edges of the core layer and the metal or metal oxide layer; and the longitudinal edges of the at least two part webs are sealed to one another in a joint in the longitudinal direction of the tube so that the edges in which said layer of metal or metal oxide is exposed from the core layer overlap the metal or metal oxide layer in the opposing edge of the web.

9. The gas- and liquid-tight packaging container as claimed in claim 8, wherein the longitudinal edges of the at least two part webs are obliquely cut and overlap one another in the joint in the longitudinal direction of the tube so that the transition between overlapping edge and subjacent packaging material will be substantially planar on both the inside and outside of the packaging container.

* * * * *